US 9,312,925 B2

(12) United States Patent
Kusaka et al.

(10) Patent No.: US 9,312,925 B2
(45) Date of Patent: Apr. 12, 2016

(54) WIRELESS COMMUNICATION APPARATUS AND WIRELESS COMMUNICATION SYSTEM

(71) Applicant: ADVANTEST CORPORATION, Tokyo (JP)

(72) Inventors: Takashi Kusaka, Gunma (JP); Masahiro Ishida, Tokyo (JP)

(73) Assignee: ADVANTEST CORPORATION, Tokyo (JP)

( * ) Notice: Subject to any disclaimer, the term of this patent is extended or adjusted under 35 U.S.C. 154(b) by 626 days.

(21) Appl. No.: 13/756,547

(22) Filed: Feb. 1, 2013

(65) Prior Publication Data

US 2013/0249307 A1    Sep. 26, 2013

(30) Foreign Application Priority Data

Mar. 21, 2012    (JP) ................. 2012-064142

(51) Int. Cl.
*H04B 5/00*    (2006.01)

(52) U.S. Cl.
CPC ............ *H04B 5/0037* (2013.01); *H04B 5/0031* (2013.01); *H04B 5/0087* (2013.01)

(58) Field of Classification Search
CPC ... H04B 5/0037; H04B 5/0087; H04B 5/0031
USPC ........................................................ 307/104
See application file for complete search history.

(56) References Cited

U.S. PATENT DOCUMENTS

| | | | | |
|---|---|---|---|---|
| 4,292,589 A | * | 9/1981 | Bonner | ................. E21B 47/082 324/221 |
| 7,084,815 B2 | * | 8/2006 | Phillips | ................ H01Q 9/0414 343/700 MS |
| 2001/0038280 A1 | | 11/2001 | Aizawa et al. | |
| 2006/0261818 A1 | * | 11/2006 | Zank | ...................... G01V 3/088 324/457 |
| 2011/0148733 A1 | * | 6/2011 | Fahs | ..................... H01F 17/0006 343/859 |

(Continued)

FOREIGN PATENT DOCUMENTS

| | | |
|---|---|---|
| JP | 2006-105630 A | 4/2006 |
| JP | 2006-173415 A | 6/2006 |

(Continued)

OTHER PUBLICATIONS

Notice of Office Action for Korean Patent Appl. No. 10-2013-0018095, issued by the Korean Intellectual Property Office on Jan. 20, 2014.
Notice of Office Action for Chinese Patent Application No. 201310091597.0, issued by the State Intellectual Property Office of China on Sep. 22, 2014.

*Primary Examiner* — Kenneth B Wells
*Assistant Examiner* — James P Evans

(57) ABSTRACT

To realize a wireless communication apparatus with high transceiver coil mounting density, provided is a wireless communication apparatus comprising a plurality of differential coil pairs that respectively transmit and receive differential signals to and from a plurality of external differential coil pairs, through magnetic coupling, wherein one coil in a first differential coil pair among the differential coil pairs is provided at a distance from each of two coils of a second differential coil pair among the differential coil pairs that is less than or equal to a distance between the two coils of the second differential coil pair, and the other coil of the first differential coil pair is provided at a distance from each of the two coils of the second differential coil pair that is greater than the distance between the two coils of the second differential coil pair.

16 Claims, 9 Drawing Sheets

(56) References Cited

U.S. PATENT DOCUMENTS

2011/0168433 A1* 7/2011 Kusaka .............. H01L 23/49827 174/255
2013/0101005 A1* 4/2013 Aryanfar .............. H04B 5/0025 375/224

FOREIGN PATENT DOCUMENTS

| JP | 2011-66515 A | 3/2011 |
| JP | 2011-146484 A | 7/2011 |
| JP | 2011-523509 A | 8/2011 |

* cited by examiner

WIRELESS COMMUNICATION APPARATUS AND WIRELESS COMMUNICATION SYSTEM

BACKGROUND

1. Technical Field

The present invention relates to a wireless communication apparatus and a wireless communication system.

2. Related Art

Conventionally, a transceiver system that wirelessly sends and receives power or electrical signals includes a space between a transmitter having a transmission coil and a receiver having a reception coil, and transmission and reception are achieved by magnetically coupling the transmission and reception coils, as shown in Patent Documents 1 to 3, for example.

Patent Document 1: Japanese Patent Application Publication No. 2006-105630
Patent Document 2: Japanese Patent Application Publication No. 2006-173415
Patent Document 3: Japanese Patent Application Publication No. 2011-66515
Patent Document 4: Japanese Patent Application Publication No. 2011-146484

In such a transceiver system, the amount of information transmitted and received can be increased by increasing the number of transmission and reception coils. However, when transmission coils are arranged near each other, the magnetic fields generated by adjacent coils interfere with each other and disrupt the transmission signal. Furthermore, the reception coils arranged to correspond to the transmission coils receive adjacent transmission signals, and therefore the transmission and reception cannot be correctly performed. In this way, it is difficult to increase the mounting density of the reception and transmission coils in the transceiver system, and therefore the mounting surface area increases according to the amount of information being transmitted and received.

SUMMARY

Therefore, it is an object of an aspect of the innovations herein to provide a wireless communication apparatus and a wireless communication system, which are capable of overcoming the above drawbacks accompanying the related art. The above and other objects can be achieved by combinations described in the claims. According to a first aspect of the present invention, provided is a wireless communication apparatus comprising a plurality of differential coil pairs that respectively transmit and receive differential signals to and from a plurality of external differential coil pairs, through magnetic coupling, wherein one coil in a first differential coil pair among the differential coil pairs is provided at a distance from each of two coils of a second differential coil pair among the differential coil pairs that is less than or equal to a distance between the two coils of the second differential coil pair, and the other coil of the first differential coil pair is provided at a distance from each of the two coils of the second differential coil pair that is greater than the distance between the two coils of the second differential coil pair.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
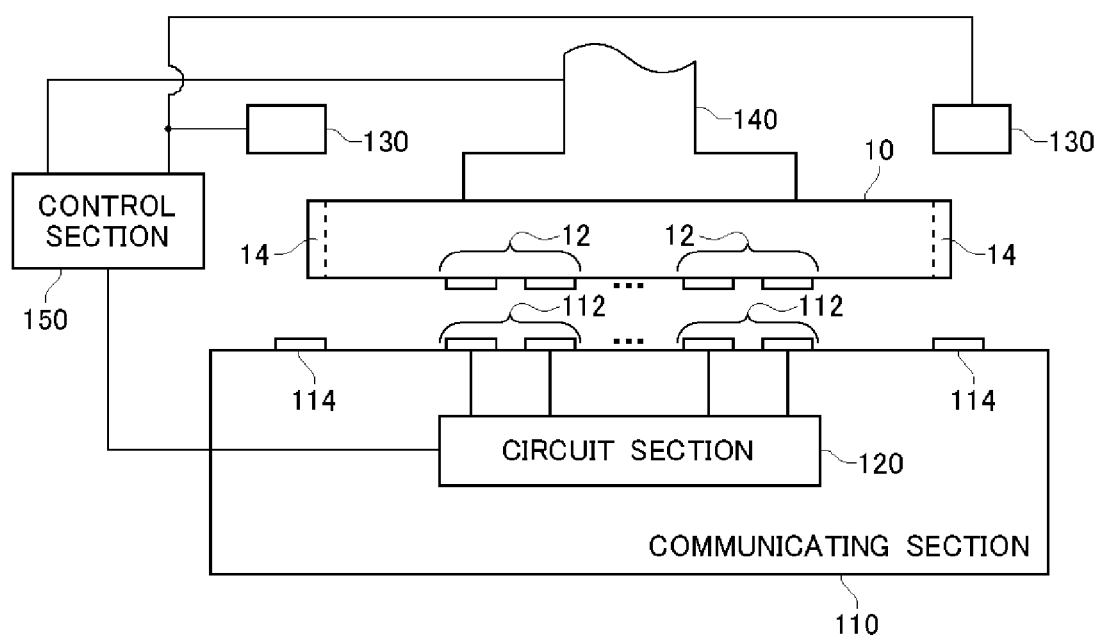
FIG. 1 shows an exemplary configuration of a wireless communication system 100 according to an embodiment of the present invention.

FIG. 1 shows an exemplary configuration of a wireless communication system 100 according to an embodiment of the present invention. The wireless communication system 100 improves the mounting density of a plurality of differential coil pairs while maintaining communication quality, by arranging the differential coil pairs in a manner to cancel out or decrease the effect of magnetic fields from adjacent differential coil pairs. The wireless communication system 100 includes a wireless communication apparatus 10, a communicating section 110, a circuit section 120, a detecting section 130, an aligning section 140, and a control section 150.

The wireless communication apparatus 10 wirelessly sends and receives power and/or transmission signals to and from an access apparatus including the communicating section 110, the circuit section 120, the detecting section 130, and the aligning section 140. The wireless communication apparatus 10 may be semiconductor device or a substrate on which a semiconductor device is mounted, and may include one of an analog circuit, a digital circuit, a memory, a CPU, a system on chip (SOC), a system in package (SIP), or the like. The wireless communication apparatus 10 includes a plurality of differential coil pairs 12 and a marker portion 14.

The differential coil pairs 12 each send and receive differential signals to and from a plurality of external differential coil pairs, through magnetic coupling. The differential coil pairs 12 are connected respectively to internal differential wires, and each transmit a differential signal according to a transmitted differential electrical signal. The differential coil pair 12 may transmit to the connected differential wires a received differential signal, as the differential electrical signal. A detailed description of the differential coil pairs 12 is provided further below with reference to FIG. 2.

The marker portion 14 is provided at a predetermined position relative to the differential coil pairs 12 in the wireless communication apparatus 10. The marker portion 14 may be a protrusion or depression formed in a surface that is substantially perpendicular to the surface of the wireless communication apparatus 10 on which the differential coil pairs 12 are formed. Instead, the marker portion 14 may be a through-hole that passes through the surface of the wireless communication apparatus 10 on which the differential coil pairs 12 are formed. A plurality of the marker portions 14 may be provided in the wireless communication apparatus 10.

The communicating section 110 includes external coil pairs 112 serving as the external differential coil pairs that correspond to the differential coil pairs 12 of the wireless communication apparatus 10, and communicates with the wireless communication apparatus 10. The communicating section 110 includes the external coil pairs 112, a reference position portion 114, and a circuit section 120.

The external coil pairs 112 are provided on the communicating section 110, and communicate with the differential coil pairs 12. The external coil pairs 112 are arranged to correspond to the arrangement of the differential coil pairs 12, and the number of external coil pairs 112 provided is the same as the number of differential coil pairs 12. In this case, the external coil pairs 112 may be arranged on a surface facing the surface of the wireless communication apparatus 10 on which the differential coil pairs 12 are arranged.

The number of external coil pairs 112 may be greater than the number of differential coil pairs 12, in which case one communicating section 110 may communicate with each of a plurality of wireless communication apparatuses 10. The external coil pairs 112 are connected to the respective internal differential wires, and may transmit the received differential signals to the differential wires, as the differential electrical signal. The external coil pairs 112 may be formed in the same manner as the differential coil pairs 12, as described in FIG. 2 and onward.

The reference position portion 114 is provided on the communicating section 110 at a predetermined position relative to the external coil pairs 112. The reference position portion 114 may be a protrusion or depression formed in a surface of the communicating section 110 in which the external coil pairs 112 are formed. The reference position portion 114 provides a reference for a position of the wireless communication apparatus 10 relative to the communicating section 110.

The circuit section 120 is connected to the external coil pairs 112 and exchanges power and/or electrical signals with the external coil pairs 112. The circuit section 120 transmits, to each of a plurality of corresponding external coil pairs 112 among the external coil pairs 112, an electrical signal corresponding to the power or electrical signal to be transmitted to the wireless communication apparatus 10. Furthermore, the circuit section 120 receives, from each of the corresponding external coil pairs 112, an electrical signal corresponding to the power or electrical signal received from the wireless communication apparatus 10. The circuit section 120 transmits a differential signal, which is an electrical signal to be transmitted or received by the external coil pairs 112.

The detecting section 130 detects the marker portion 14 and the reference position portion 114. The detecting section 130 may include an image capturing section that captures an image of the marker portion 14 and the reference position portion 114, and detect the marker portion 14 and the reference position portion 114 from a captured image. Instead, the detecting section 130 may include a light source such as a laser light that illuminates the marker portion 14 and the reference position portion 114 and a light detector that detects the light reflected from these portions, and may detect the marker portion 14 and the reference position portion 114 based on change in the brightness of the reflected light.

The aligning section 140 adjusts the relative positions of the marker portion 14 and the reference position portion 114.

The aligning section 140 moves the position of the wireless communication apparatus 10, while holding the wireless communication apparatus 10. The aligning section 140 moves the position of the wireless communication apparatus 10 while maintaining a state in which the surface of the wireless communication apparatus 10 on which the differential coil pairs 12 are formed faces the surface of the communicating section 110 on which the external coil pairs 112 are formed. The aligning section 140 may move the position of the wireless communication apparatus 10 while maintaining a predetermined distance between the wireless communication apparatus 10 and the communicating section 110.

The control section 150 is connected to the aligning section 140, and controls the movement of the wireless communication apparatus 10. The control section 150 may move the wireless communication apparatus 10 to have a predetermined position relative to the communicating section 110. The control section 150 may be connected to the detecting section 130, and control movement of the wireless communication apparatus 10 according to the detection result of the detecting section 130 for the marker portion 14 and the reference position portion 114. The control section 150 may move the wireless communication apparatus 10 until the detected positions of the marker portion 14 and the reference position portion 114 are within a predetermined range.

The control section 150 may be connected to the circuit section 120 and control communication of the wireless communication apparatus 10 and the communicating section 110 by beginning the exchange of electrical signals through the circuit section 120 after ending the movement of the wireless communication apparatus 10. Furthermore, the control section 150 may perform fine adjustments of the position of the wireless communication apparatus 10, according to the communication quality of the wireless communication apparatus 10 and the communicating section 110.

In this way, the wireless communication system 100 according to the present embodiment changes the relative positions of the external coil pairs 112 and the corresponding differential coil pairs 12 to be within a predetermined range, by moving the wireless communication apparatus 10 such that the position of the wireless communication apparatus 10 relative to the communicating section 110 is within a predetermined range, and performs communication between the coils. Here, the wireless communication apparatus 10 may operate according to power supplied from the communicating section 110, in which case there is no need for an internal power source.

Figure 2:
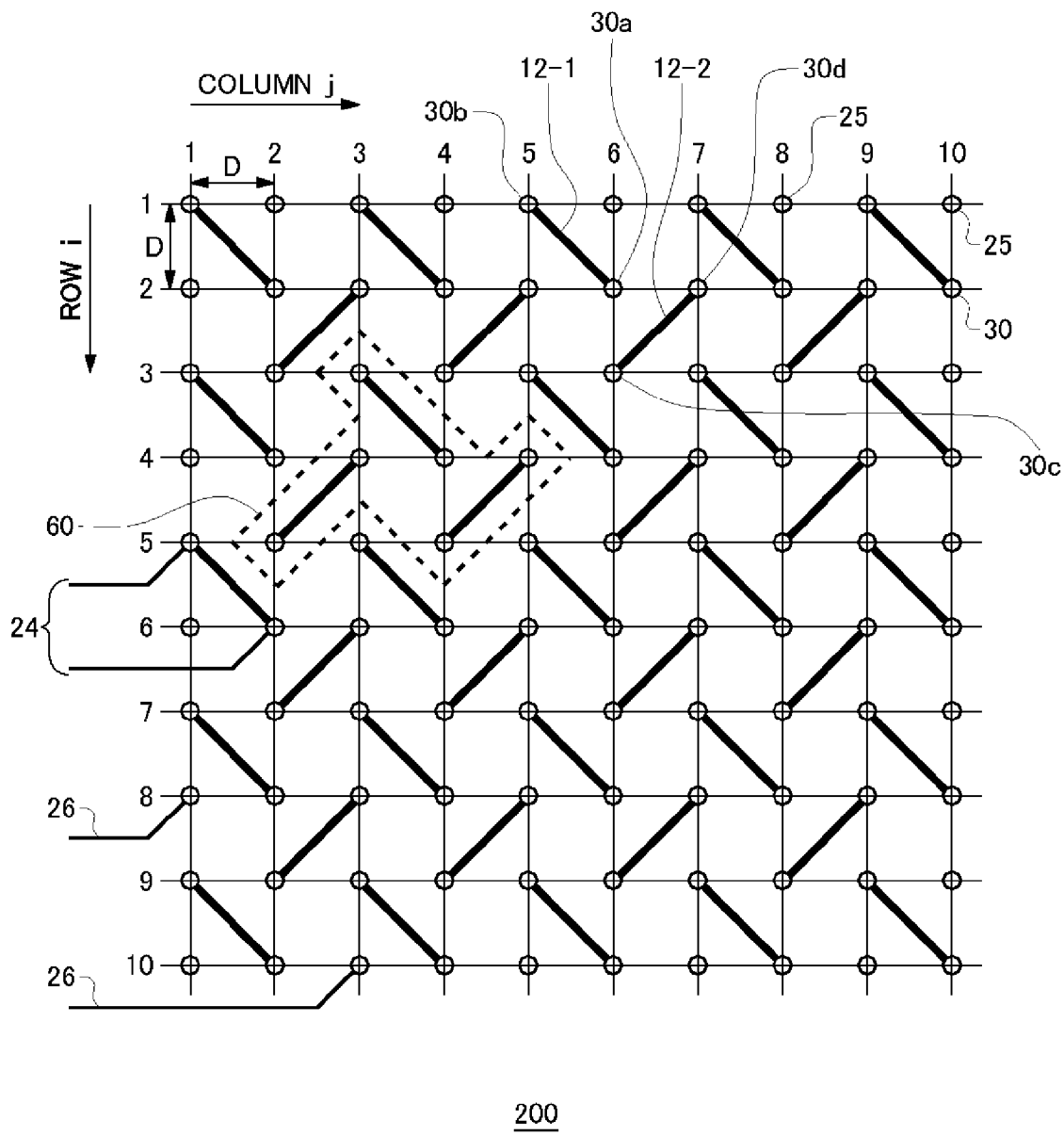
FIG. 2 shows an exemplary arrangement of differential coil pairs 12 of the wireless communication apparatus 10 according to the first embodiment.

FIG. 2 shows an exemplary arrangement of differential coil pairs 12 of the wireless communication apparatus 10 according to the first embodiment. In FIG. 2, a coil 30 is arranged at each position indicated by a circle. A differential coil pair 12 is formed by two adjacent coils 30. The present embodiment shows two differential coil pairs 12-1 and 12-2 that are each formed by two adjacent coils 30 connected by a straight line.

One coil 30 in a first differential coil pair among the plurality of differential coil pairs 12 is provided at a distance, from two coils 30 of a second differential coil pair among the differential coil pairs 12, that is less than or equal to the distance between these two coils 30. The other coil 30 in the first differential coil pair is provided at a distance, from the two coils 30 of the second differential coil pair, that is greater than the distance between the two coils 30. The following describes an example using the differential coil pair 12-1 of a first differential coil pair and the differential coil pair 12-2 of a second differential coil pair, from among the plurality of differential coil pairs 12.

In FIG. 2, the one coil 30a of the differential coil pair 12-1 is provided at a distance, from the two coils 30 of the coil pair 12-2, that is less than the distance between these two coils 30. Furthermore, the other coil 30b of the differential coil pair 12-1 is provided at a distance, from the two coils 30 of the coil pair 12-2, that is greater than the distance between these two coils 30.

The arrangement direction of the two coils of the first differential coil pair differs from the arrangement direction of the two coils of the second differential coil pair. In other words, in FIG. 2, the arrangement direction of the differential coil pair 12-1 is from the coil 30a to the coil 30b, and this differs from the arrangement direction of the two coils 30 of the coil pair 12-2.

The differential wires 24 each include a positive wire and a negative wire that electrically transmit differential signals, and the differential coil pairs 12 correspond respectively to the differential wires 24. The two coils included in each differential coil pair 12 are respectively a positive coil that is connected to the positive wire of the corresponding differential wire and a negative coil that is connected to the negative wire of the differential wire.

In FIG. 2, the two coils 30 of each differential coil pair 12 are each connected electrically to a differential wire 24. Each differential wire 24 is connected to an internal circuit formed in the wireless communication apparatus 10, and transmits a differential signal to this internal circuit. Each differential wire 24 includes a positive wire that transmits the positive signal and a negative wire that transmits the negative signal, and transmits and receives differential signals by using the signal voltage difference between these two wires.

In FIG. 2, only one differential wire 24 is shown, but a differential wire 24 is provided for each differential coil pair 12. In other words, each differential wire 24 is connected to one of the adjacent coils 30 in a differential coil pair 12. For example, the coil 30a of the differential coil pair 12-1 is the positive coil connected to the positive wire, and the coil 30b is the negative coil connected to the negative wire.

For at least two differential coil pairs 12 among the plurality of differential coil pairs 12, the distance between the positive coils differs from the distance between the negative coils, and concerning (I) a set of the distance from the positive coil of one differential coil pair 12 to the negative coil of another differential coil pair 12 and the distance from the positive coil of the one differential coil pair 12 to the positive coil of the other differential coil pair 12 and (II) a set of the distance from the negative coil of one differential coil pair to the positive coil of another differential coil pair 12 and the distance from the negative coil of the one differential coil pair to the negative coil of the other differential coil pair 12, the distances in at least one of (I) and (II) are substantially equal to each other. In this example, the coil 30c of the differential coil pair 12-2 is the positive coil connected to a positive wire, and the coil 30d is a negative coil connected to a negative wire.

In other words, in the differential coil pairs 12-1 and 12-2, the distance between the positive coils 30a and 30c is different from the distance between the negative coils 30b and 30d. Furthermore, the distance from the positive coil 30a of the differential coil pair 12-1 to the positive coil 30c of the differential coil pair 12-2 is substantially equal to the distance from the positive coil 30a to the negative coil 30d.

Furthermore, the distance from the negative coil 30b of the differential coil pair 12-1 to the positive coil 30c of the differential coil pair 12-2 is substantially the same as the distance from the negative coil 30b to the negative coil 30d. In other words, in this embodiment, concerning (I) a set of the distance from the positive coil of one differential coil pair 12 to the negative coil of another differential coil pair 12 and the distance from the positive coil of the one differential coil pair 12 to the positive coil of the other differential coil pair 12 and (II) a set of the distance from the negative coil of one differential coil pair to the positive coil of another differential coil pair 12 and the distance from the negative coil of the one differential coil pair to the negative coil of the other differential coil pair 12, the distances in both (I) and (II) are substantially equal to each other.

Here, the positive and negative coil included in each differential coil pair 12 may be arranged in a grid 200, and at least two adjacent differential coil pairs 12 have different arrangement directions. The coils 30 may be arranged at intersections of the line forming the grid 200.

The shape of the grid 200 may be such that the arrangement positions of the coils are at repeating constant intervals in a row direction and a column direction that are orthogonal to each other. For example, in the present embodiment, the coils 30 are arranged in a grid 200 shaped such that the lines of the grid are arranged at constant intervals D in the column direction (j) and the row direction (i), which are orthogonal to each other.

In the present embodiment, the differential coil pairs 12 may be formed by two adjacent coils 30. Here, "adjacent" coils 30 refer to a case where one coil 30 is connected to the other coil 30 by a straight line having an angle of 45 degrees relative to the row direction and the column direction and the distance between the coils 30 is $2^{0.5} \times D$.

In the present embodiment, each differential coil pair 12 is arranged such that the direction of the straight line connecting the pair of coils 30 in each differential coil pair 12 has an angle of 45 degrees relative to the row direction and the column direction. Here, the coordinate position of each coil 30 in the grid 200 is expressed by Bij. For example, the coordinate position of the coil 30 in the first row and second column is expressed as B12. A differential coil pair 12 is expressed as (Bij, Bi'j'), using the coordinate positions of two coils 30.

For example, the differential coil pair (B52, B43) and the differential coil pair (B33, B44) are adjacent to each other. Here, "adjacent" differential coil pairs 12 refers to a case in which one of the coils 30 included in one of the differential coil pairs 12 is at a distance D from one of the coils 30 included in the other differential coil pair 12. In other words, the coils 30 included in the differential coil pair (B33, B44) are each at a distance D from the coil 30 (B43), which is one of the coils in the adjacent differential coil pair (B52, B43).

In the present embodiment, adjacent differential coil pairs 12 may be arranged such that the straight lines connecting coils 30 included in adjacent differential coil pairs 12 are oriented in different directions. In other words, for each differential coil pair 12, the direction of the straight line connecting the two coils 30 included in the differential coil pair 12 differs from the direction of the straight line connecting the two coils 30 included in another adjacent differential coil pair 12. For example, the direction of the straight line connecting the coils 30 included in the differential coil pair (B52, B43) is different from the direction of the straight line connecting the coils 30 included in the differential coil pair (B33, B44).

The coils 30 are arranged in the grid 200 at constant intervals D in the row direction (i) and column direction (j), which are orthogonal to each other. Here, a differential coil pair 12 formed by two coils 30 adjacent in a first arrangement direction that is at an angle of 45 degrees relative to both the row direction (i) and the column direction (j) is set as a first differential coil pair, a differential coil pair 12 formed by two coils 30 adjacent in a second arrangement direction that is orthogonal to the first arrangement direction is set as a second differential coil pair, and the first differential coil pairs 12-1 and second differential coil pairs 12-2 are arranged in an alternating manner in both the first arrangement direction and the second arrangement direction.

The differential coil pair 12 (B33, B44) formed by the coils B33 and B44 is arranged on a straight line that has an angle of 45 degrees relative to both the row direction and the column direction. The direction of this straight line is set as the first arrangement direction. The differential coil pairs 12 arranged in this direction are the first differential coil pairs 12-1.

The differential coil pair 12 (B52, B43) formed by the coils B52 and B43 is arranged on a straight line that has an angle of 45 degrees relative to both the row direction and the column direction. The direction of this straight line is set as the second arrangement direction. The differential coil pairs 12 arranged in this direction are the second differential coil pairs 12-2.

Here, the first arrangement direction is orthogonal to the second arrangement direction. In other words, the straight lines connecting the coils 30 included in each first differential coil pair 12-1 and the straight lines connecting the coils 30 included in each second differential coil pair 12-2 are orthogonal to each other.

The first differential coil pairs 12-1 and the second differential coil pairs 12-2 may be arranged in an alternating manner in both the first arrangement direction and the second arrangement direction. For example, first differential coil pairs 12-1 and second differential coil pairs 12-2 adjacent in the first arrangement direction may be arranged in an alternating manner as shown by the differential coil pair 12-1 (B33, B44), the differential coil pair 12-2 (B54, B45), and the differential coil pair 12-1 (B55, B66). Furthermore, first differential coil pairs 12-1 and second differential coil pairs 12-2 adjacent in the second arrangement direction may be arranged in an alternating manner as shown by the differential coil pair 12-2 (B52, B43), the differential coil pair 12-1 (B33, B44), and the differential coil pair 12-2 (B34, B25).

As described further below, in the present embodiment, the coil pairs are arranged such that a straight line obtained by extending each of the first differential coil pairs 12-1 passes through (the center) of second differential coil pairs 12-2 adjacent to the first differential coil pair 12-1 in the first arrangement direction, and a straight line obtained by extending each of the second differential coil pairs 12-2 passes through (the center) of first differential coil pairs 12-1 adjacent to the second differential coil pair 12-2 in the second arrangement direction.

Figure 3:
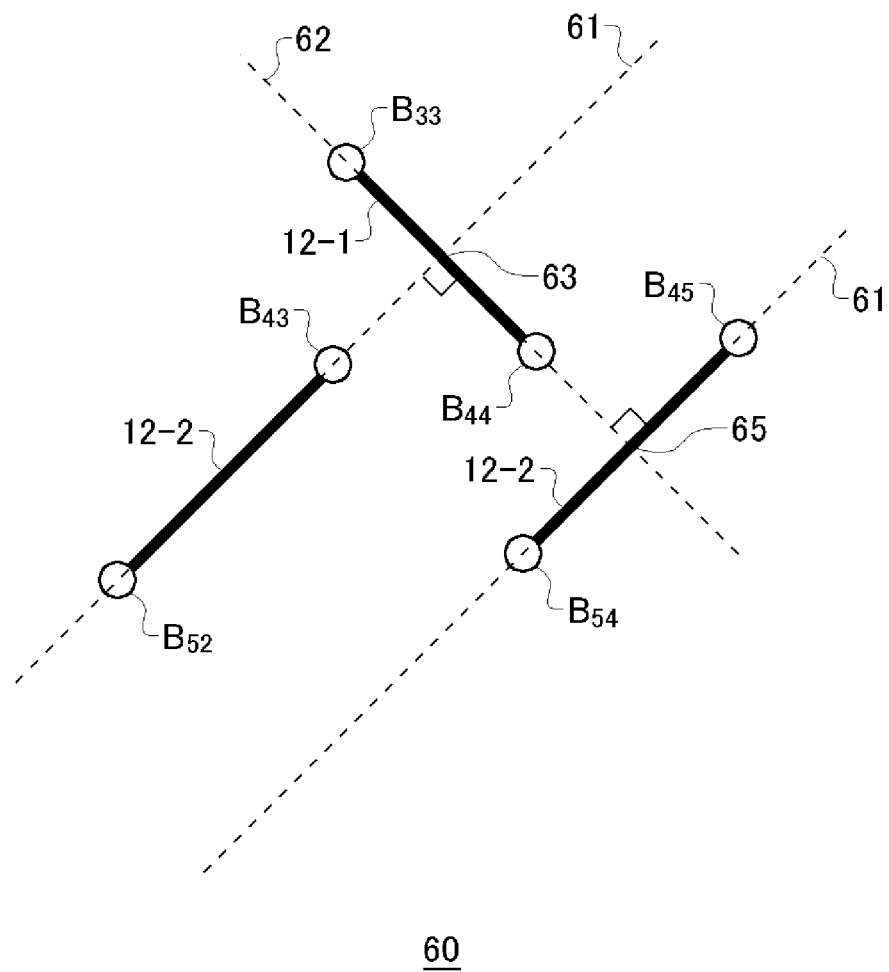
FIG. 3 is a partial enlarged view of the wireless communication apparatus 10 according to the first embodiment.

FIG. 3 is a partial enlarged view of the grid 200 of the wireless communication apparatus 10 according to the first embodiment. FIG. 3 is an enlarged view of the portion 60 of the grid 200 shown in FIG. 2. The coils 30 included in the second differential coil pair 12-2 (B52, B43) are arranged on the straight line 61 extending through the differential coil pair 12-2 (B52, B43). In other words, a straight line extending through a differential coil pair refers to a straight line obtained by extending the straight line connecting the coils 30 included in the differential coil pair. Second differential coil pairs 12-2 are the differential coil pair 12-2 (B52, B43) and the differential coil pair 12-2 (B54, B45), for example.

The straight line 62 shows a straight line extending through a first differential coil pair 12-1. The first differential coil pair (B33, B44) is an example of a first differential coil pair. Here, the straight lines 61 and the straight line 62 are orthogonal. A straight line 61 passes through the center 63 of the first differential coil pair 12-1 (B33, B44) adjacent to the second differential coil pair 12-2 (B52, B43) in the second arrangement direction. The straight line 62 extending through the first differential core pair 12-1 (B33, B44) passes through the center 65 of the second differential coil pair 12-2 (B54, B65) adjacent to the first differential core pair 12-1 (B33, B44) in the first arrangement direction.

The following describes interference between coils 30 in adjacent differential coil pairs 12. Here, "interference" includes interference exerted by the coils 30 included in an differential coil pair 12 on the coils 30 included in an adjacent differential coil pair 12, and also interference exerted by at least one coil 30 included in a differential coil pair 12 on an adjacent differential coil pair 12.

The following describes the interference exerted by the two differential coils B33 and B44 included in the differential coil pair 12-1 (B33, B44) on the coil 43B included in the differential coil pair 12-2 (B52, B43) adjacent to the differential coil pair 12-1. As shown in FIGS. 2 and 3, each differential coil pair 12 is arranged such that both of the coils 30 included in the differential coil pair 12 are at substantially the same distance from at least one of the coils 30 included in at least one of the adjacent differential coil pairs 12.

For example, each of the coils B33 and B44 are the same distance D from the coil B43. The transmission signal flowing through the coils B33 and B44 of the differential coil pair 12-1 (B33, B44) is a differential signal, and therefore includes two signals with phases differing by 180 degrees.

Accordingly, the interference on the coil B43 exerted by the coil B33 and the interference exerted on the coil B43 by the coil B44 have the same amplitude and inverse phases. These two interferences cancel each other out at the coil B43, and therefore the coil B43 does not receive significant interference from the adjacent differential coil pair (B33, B44).

The following describes the interference exerted by the coil B43 on the adjacent differential coil pair 12-1 (B33, B44). The coils B33 and B44 are both the same distance D from the coil B43, and therefore the coil B43 causes the same interference in each of the coils B33 and B44.

Since a differential signal flows through the differential coil pair 12-1 (B33, B44), the interference exerted on the coil B33 by the coil B43 and the interference exerted on the coil B44 by the coil B43 are cancelled out. In other words, the interference exerted on the adjacent differential coil pair 12-1 (B33, B44) by the coil B43 can practically be ignored.

The above relationship is established between the coils 30 included in one of the differential coil pairs 12 in the grid 200 and the coils 30 included in the differential coil pairs 12 adjacent to these coils 30. Accordingly, with the first embodiment, the interference between coils 30 included in adjacent differential coil pairs can be decreased, and the coils 30 can be arranged with high density.

The wireless communication apparatus 10 of the present embodiment may further include one or more single coils 25 that send and receive a reference potential, power supply, or single-ended signal to and from external coils, via magnetic coupling. In this case, the single coils 25 are arranged in a grid 200 shape. Instead, the single coils 25 may be arranged in the regions remaining after the differential coil pairs 12 have been arranged.

The wireless communication apparatus 10 further includes single wires 26 that are electrically connected to the single coils 25 and transmit the reference potential, power supply, or single-ended signal. For example, single wires 26 for a ground connection, power supply, or single signal may be arranged at the outermost periphery of the grid 200 and connected to single coils 25 that are not included in any differential coil pair 12.

As shown in FIG. 2, when the differential coil pairs 12 are arranged in a grid 200 in which the number of coils 30 is the same in the row direction and column direction and the outer periphery is a square, the outermost periphery of the grid 200 can include a single coil 25 that is not in any differential coil pair 12 arranged at every other grid position. For example, the single coils 25 may be the coils B21, B41, B61, B81, B101, B12, B14, B16, B18, B110, and the like.

These single coils 25 that are not included in any differential coil pair 12 may be assigned to be used for a ground, a power supply, or a single signal. A single wire 26 for a ground, a power supply, or a single signal is connected to one of the single coils 25. In the wireless communication apparatus 10 of the present example, among the coils 30 arranged in the outermost periphery of the grid, every other coil 30 is a single coil 25 that is not included in any differential coil pair 12, and single wires 26 are provided and connected to these single coils 25.

Instead, the single coils 25 may be one or more electrode sections that are arranged in the grid 200 and electrically connected to the outside to send and receive a reference potential, power supply, or single-ended signal to and from the outside. The electrode sections are described further below.

Figure 4:
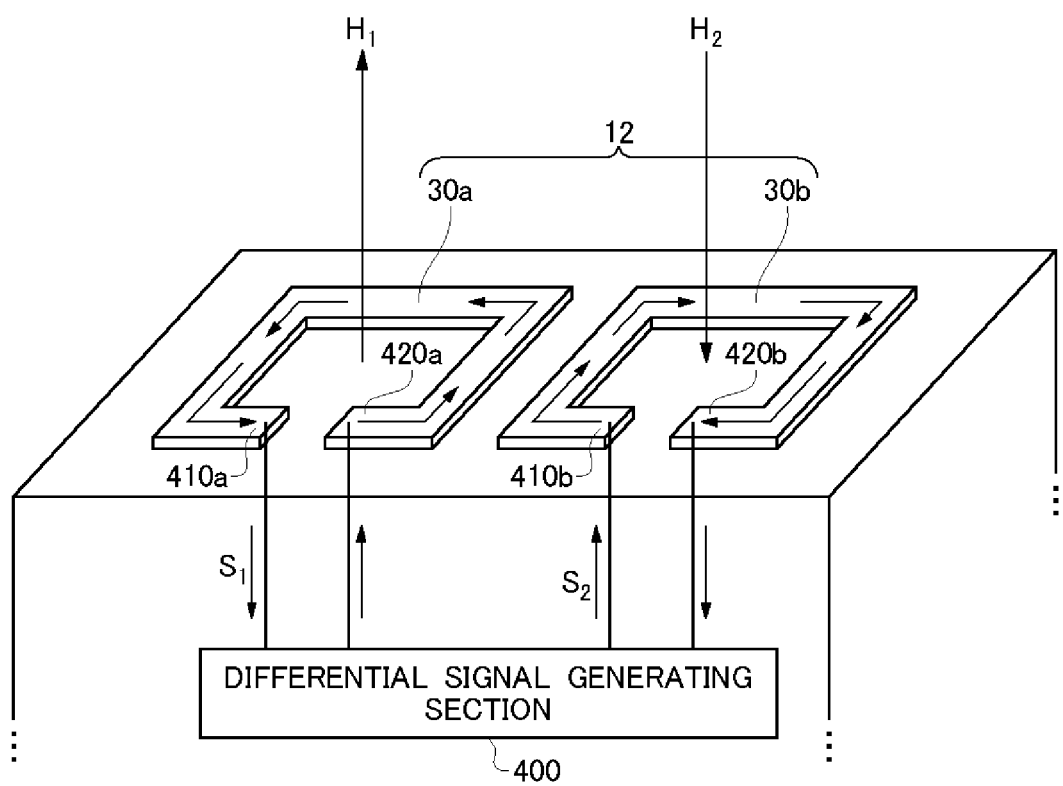
FIG. 4 shows a first exemplary configuration of a differential coil pair 12 of the wireless communication apparatus 10 according to the present embodiment.

FIG. 4 shows a first exemplary configuration of a differential coil pair 12 of the wireless communication apparatus 10 according to the present embodiment. FIG. 4 describes an example in which one differential coil pair 12 is mounted on the wireless communication apparatus 10 and connected to a differential signal generating section 400 among the internal circuits of the wireless communication apparatus 10, and generates a communication signal.

The differential signal generating section 400 generates a differential signal. Here, the differential signal generating section 400 generates the differential signal by superimposing a transmission signal on a carrier wave having a predetermined frequency, in order to communicate wirelessly with the wireless communication apparatus 10. In this case, the differential signal generating section 400 may modulate the frequency, phase, amplitude, or the like of the carrier wave with the signal to be transmitted. The differential signal generating section 400 may generate a modulation signal according to the power or signal being transmitted.

The positive coil 30*a* and the negative coil 30*b* of the differential coil pair 12 are each connected to the differential signal generating section 400. Here, the shape of the coils, input sections 410, and output sections 420 are formed to be substantially analogous in the positive coil 30*a* and the negative coil 30*b*. Furthermore, the positive coil 30*a* is connected to the positive wire from the differential signal generating section 400, the negative coil 30*b* is connected to the negative wire, and these two coils respectively generate inversely oriented magnetic fields $H_1$ and $H_2$ when the differential signal is input.

For example, the positive coil 30*a* generates the magnetic field $H_1$ when the differential signal $S_1$ is input to the input section 410*a* and current flows toward the differential signal generating section 400 from the input section 410*a*. Furthermore, in this case, the negative coil 30*b* generates the magnetic field $H_2$ when the differential signal $S_2$, which has a phase that is inverted with respect to the differential signal $S_1$, is input to the input section 410*b* and current flows toward the input section 410*b* from the differential signal generating section 400.

In this way, the positive coil 30*a* generates the magnetic field $H_1$ corresponding to the current flowing to the input section 410*a* from the output section 420*a*, and the negative coil 30*b* generates the magnetic field $H_2$, which has the opposite orientation of the magnetic field generated by the positive coil 30*a*, corresponding to the current flowing to the output section 420*b* from the input section 410*b*. In the same manner, the positive coil 30*a* generates a magnetic field having an orientation opposite that of the magnetic field $H_1$ when current flows from the input section 410*a* to the output section 420*a*, and the negative coil 30*b* generates a magnetic field having an orientation that is opposite that of the magnetic field generated by the positive coil 30*a* corresponding to the current flowing from the output section 420*b* to the input section 410*b*.

In this way, in response to the input of the differential signal, the differential coil pair 12 can generate a differential magnetic field and can transmit power and/or a communication signal to the corresponding external coil pair 112 of the communicating section 110.

Figure 5:
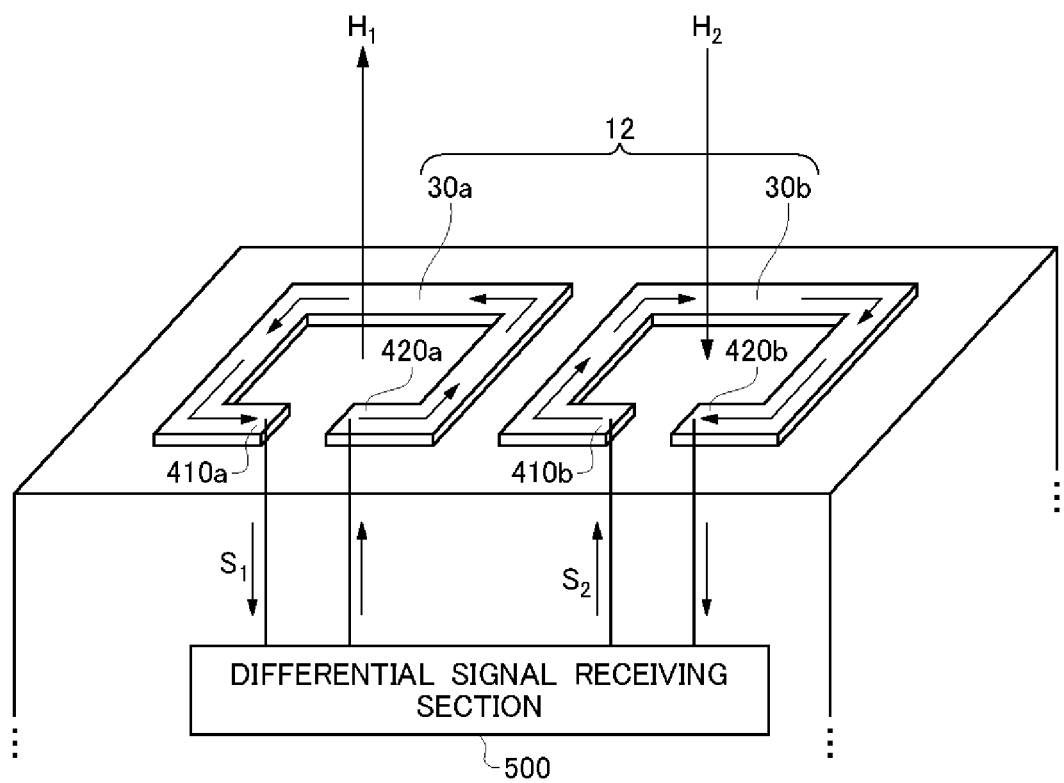
FIG. 5 shows a second exemplary configuration of a differential coil pair 12 of the wireless communication apparatus 10 according to the present embodiment.

FIG. 5 shows a second exemplary configuration of a differential coil pair 12 of the wireless communication apparatus 10 according to the present embodiment. FIG. 5 describes an example in which one differential coil pair 12 is mounted on the wireless communication apparatus 10 and connected to a differential signal receiving circuit 500 among the internal circuits of the wireless communication apparatus 10, and receives a communication signal.

In this case, the differential coil pair 12 receives power and/or a transmission signal, through a process that is the inverse of the communication signal transmission described in FIG. 4. Specifically, the corresponding external coil pair 112 of the communicating section 110 generates the differential magnetic field corresponding to the differential signal in the same manner as described in FIG. 4, and the differential coil pair 12 receives this differential magnetic field by magnetically coupling with the external coil pair 112.

The positive coil 30*a* is coupled to the one magnetic field for transmitting the positive signal of the received magnetic field, and causes current to flow through the positive wire of the differential wire using induced electromotive force corresponding to this magnetic field. The negative coil 30*b* is coupled to the other magnetic field, which is for transmitting the negative signal, and causes current to flow through the negative wire of the differential wire, in a direction opposite that of the current in the positive wire, using induced electromotive force corresponding to this magnetic field.

For example, when the magnetic field $H_1$ is received from the positive coil of the corresponding external coil pair 112, the positive coil 30*a* causes current to flow from the output section 420*a* to the input section 410*a*, by using the induced electromotive force corresponding to the magnetic field $H_1$. In this case, the magnetic field $H_2$ is received from the negative coil of the corresponding external coil pair 112, and the negative coil 30*b* causes current to flow from the input section 410*b* to the output section 420*b*, by using the induced electromotive force corresponding to the magnetic field $H_2$.

In this way, the positive coil 30*a* and the negative coil 30*b* receive the differential signal by magnetically coupling with the corresponding external coil pair 112, and transmit the received differential signal to the differential signal receiving circuit 500. The differential signal receiving circuit 500 includes a termination circuit or the like, receives the transmitted differential signal, and transmits a signal corresponding to the differential signal to an internal circuit of the wireless communication apparatus 10. In this way, the differential coil pair 12 can generate an induced electromotive force according to the differential signal transmitted by the external coil pair 112, and wirelessly receive power and/or a communication signal.

Figure 6:
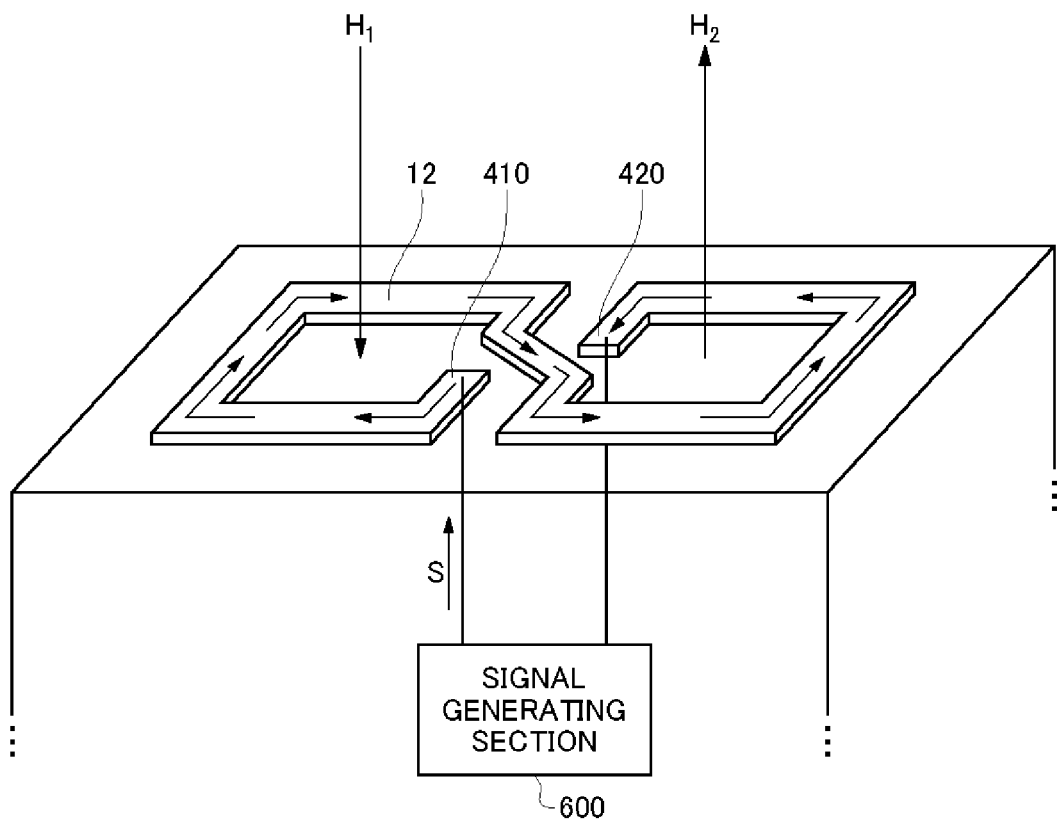
FIG. 6 shows a modification of the differential coil pair 12 of the wireless communication apparatus 10 according to the present embodiment.

FIG. 6 shows a modification of the differential coil pair 12 of the wireless communication apparatus 10 according to the present embodiment. The differential coil pair 12 of the present embodiment is an 8-shaped coil that, upon receiving a single-ended signal, converts the single-ended signal into a differential signal and transmits the differential signal, and upon receiving a differential signal, converts the received differential signal into a single-ended signal. FIG. 6 describes an example in which one differential coil pair 12 is mounted on the wireless communication apparatus 10 and connected to a signal generating section 600 among the internal circuits of the wireless communication apparatus 10, and generates a communication signal.

The signal generating section 600 generates a single-ended signal with a reference potential such as 0 V and a voltage potential difference defining high and low. Here, the signal generating section 600 generates a signal by superimposing a single-ended signal on a carrier wave with a predetermined frequency, to wirelessly communicate with the wireless communication apparatus 10. In this case, the signal generating section 600 may modulate the frequency, phase, or amplitude of the carrier wave with the single-ended signal. The signal generating section 600 may generate the single-ended signal according to power or a signal to be transmitted.

The input section 410 and the output section 420 of the differential coil pair 12 are each connected to the signal generating section 600. For example, when the transmission signal S that has been modulated with the single-ended signal is input to the input section 410 and current flows in the 8-shaped coil from the input section 410 toward the output section 420, the current flowing through the input section 410 side of the coil and the current flowing through the output section 420 side of the coil have different orientation, and therefore two magnetic fields $H_1$ and $H_2$ generated by the two coil portions have inverted orientations.

In the same manner, when the current flows through the 8-shaped coil from the output section 420 toward the input section 410, in response to the input of a single-ended signal, the differential coil pair 12 can generate a differential magnetic field and wirelessly transmit the power and/or communication signal toward the corresponding external coil pair 112 of the communicating section 110. In the manner described above, the differential coil pair 12 can generate a differential magnetic field containing magnetic fields with inverted orientations, and transmit a communication signal to the communicating section 110 by magnetically coupling with the corresponding external coil pair 112.

Furthermore, upon receiving a differential magnetic field by magnetically coupling with the corresponding external coil pair 112, the differential coil pair 12 of the present modification generates current flowing from the input section 410 to the output section 420 or from the output section 420 to the input section 410, and converts the received differential magnetic field into a single-ended signal. In this way, the differential coil pair 12 can receive a communication signal from the communicating section 110 by magnetically coupling with the corresponding external coil pair 112 and receiving the differential magnetic field in which the magnetic fields have inverted orientations.

Here, among the plurality of differential coil pairs 12, for at least two adjacent differential coil pairs, the positive coils 30a and the negative coils 30b may have different resonance frequencies. In this way, when one differential coil pair 12 transmits or receives power using the resonance frequency, another adjacent differential coil pair 12 has a different resonance frequency, and therefore the effect on the communication of the original differential coil pair 12 can be decreased.

A plurality of the differential coil pairs 12 may transmit and receive a plurality of differential signals using two or more frequencies. For example, when a plurality of differential coil pairs 12 communicate using carrier waves with substantially the same frequency, the wireless communication apparatus 10 and/or access apparatus generates leakage power with a high value at this frequency. Therefore, the differential coil pairs 12 decrease the high value of this leakage power frequency characteristic by performing communication using carrier waves with a plurality of frequencies.

In this case, in order to decrease the high value of the leakage power without performing frequency division multiplexing communication, the differential coil pairs 12 may perform communication while changing the frequencies of the carrier waves such that the communication frequency bands do not overlap. In this way, the wireless communication apparatus 10 and the access apparatus can decrease the high value of the leakage current relative to the frequency caused by the communication, even when performing wireless communication with a plurality of differential coil pairs 12.

The coils 30 of the wireless communication apparatus 10 according to the present embodiment described above are exemplified by one-turn coils that are wound once. Instead, the coils 30 may be wound a plurality of times. Furthermore, the shape of the coils 30 is described as being square or 8-shaped, but instead, the coils 30 may be circular, elliptical, polygonal, or a combination of these shapes.

Figure 7:
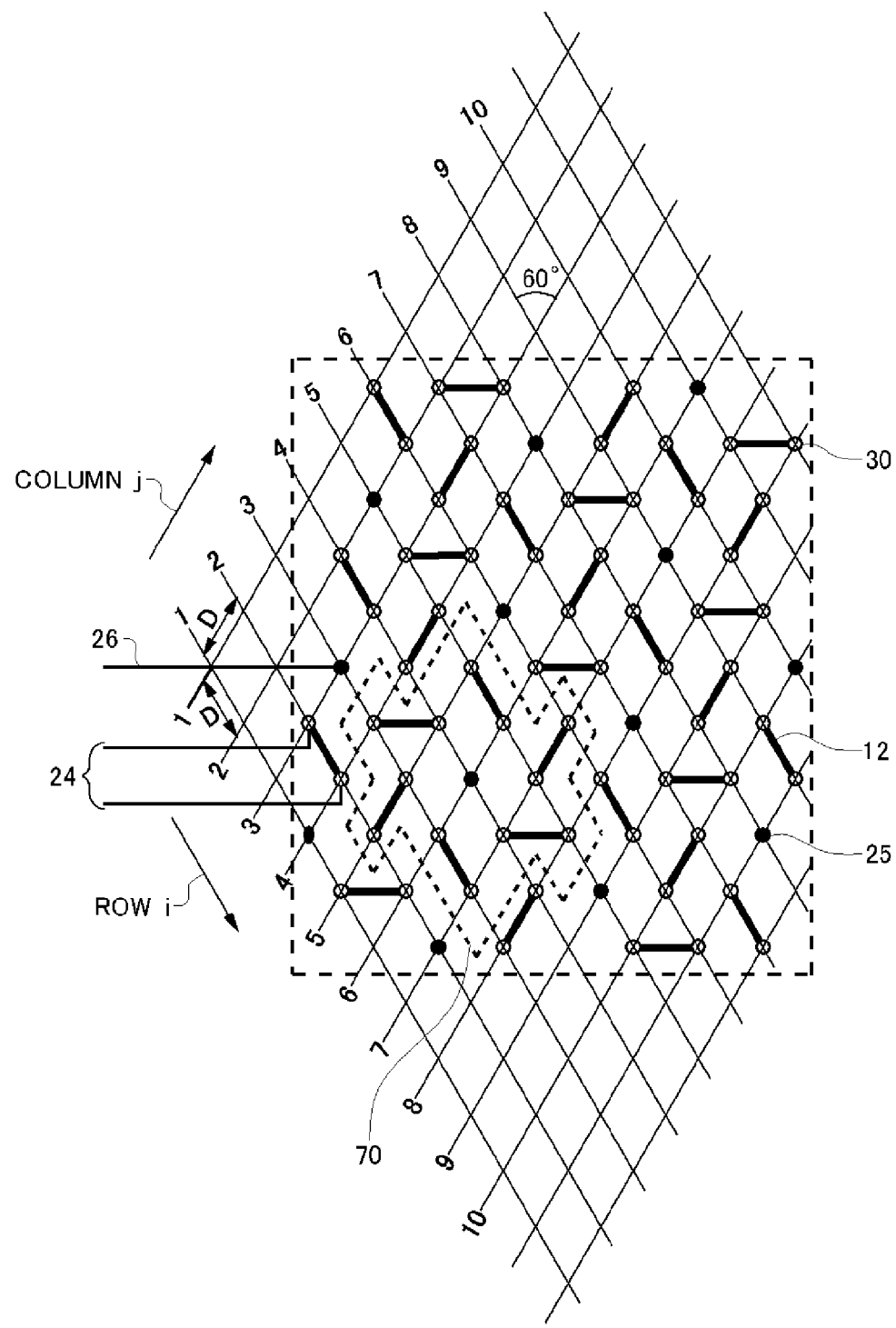
FIG. 7 shows an exemplary arrangement of differential coil pairs 12 of the wireless communication apparatus 10 according to a second embodiment.

FIG. 7 shows an exemplary arrangement of differential coil pairs 12 of the wireless communication apparatus 10 according to a second embodiment. In FIG. 7, the grid 200 is formed such that the coils 30 are arranged repeatedly at constant intervals D in the row direction (i) and the column direction (j), which are at an angle of 60 degrees relative to each other. In the same manner as in the first embodiment, the narrow lines in FIG. 7 indicate the lines of the grid, and the thick lines indicate the differential coil pairs 12.

In the present embodiment, the single coils 25 that are not included in any differential coil pair 12 are distributed uniformly. The single coils 25 are shown by black circles in FIG. 7. Here, "uniformly" refers to an arrangement in which the distance between adjacent single coils 25 is substantially equal.

In the present embodiment, the single coils 25 are arranged at the three vertices of an equilateral triangle. More specifically, the length of one side of this equilateral triangle is $7^{0.5} \times D$. The differential wires 24 are connected to the differential coil pairs 12, and the single wires 26 are connected to the single coils 25, which are indicated by black circles.

At the arrangement positions of each of the six coils 30 adjacent to each single coil 25, either the positive coil or the negative coil of one of the six adjacent differential coil pairs 12 is provided. Furthermore, the differential coil pairs 12 are arranged such that, among the six differential coil pairs 12 including the six coils 30 adjacent to each single coil 25, the orientation of each differential coil pair 12 differs by 60 degrees.

Figure 8:
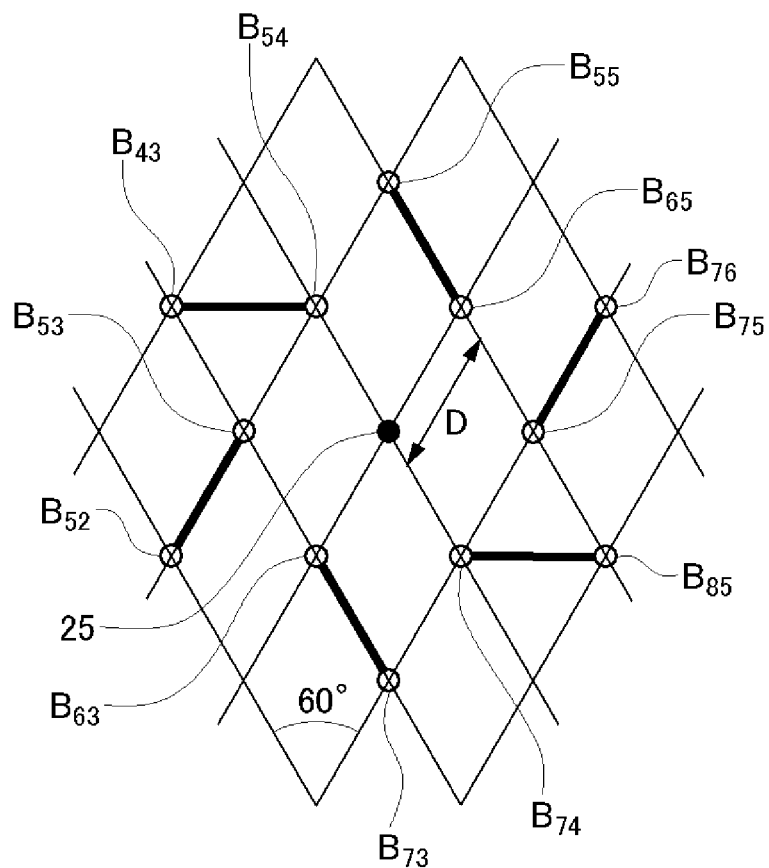
FIG. 8 shows an enlarged portion of the wireless communication apparatus 10 according to the second embodiment.

FIG. 8 shows an enlarged portion of the wireless communication apparatus 10 according to the second embodiment. FIG. 8 is an enlarged view of the portion 70 of the grid 200. The six coils B53, B54, B65, B75, B74, and B63 are adjacent to the single coil 25. Here, "adjacent" refers to a case in which the distance between the single coil 25 and the coil 30 is D.

The six coils 30 adjacent to the single coil 25 form differential coil pairs 12 together with the coils 30 arranged further outward, as seen from the single coil 25. For example, the coils B53, B54, B65, B75, B74, and B63 respectively form the differential coil pairs (B53, B52), (B54, B43), (B65, B55), (B75, B76), (B74, B85), and (B63, B73).

The directions of the six differential coil pairs 12 including the six coils 30 adjacent to the single coil 25 each differ by 60 degrees. For example, the directions of the differential coil pairs (B53, B52), (B54, B43), (B65, B55), (B75, B76), (B74, B85), and (B63, B73) sequentially differ by 60 degrees each.

Each differential coil pair 12 is adjacent to the other differential coil pairs 12 with directions that differ by 60 degrees from this differential coil pair 12. Here, differential coil pairs "adjacent" to a certain differential coil pair refer to differential coil pairs with directions that differ by 60 degrees from the certain differential coil pair and differential coil pairs in which one of the coils 30 included therein is at a distance D from one of the coils 30 included in the certain differential coil pair. For example, the differential coil pair (B54, B43) and the differential coil pair (B53, B52) are adjacent.

The six coils are arranged at the vertices of an equilateral hexagon centered on the corresponding single coil 25, and the direction of the six differential coil pair 12 increases by 60 degrees every time the relative position with respect to the corresponding single coil 25 is rotated in a first direction.

The six coils B53, B54, B65, B75, B74, and B63 adjacent to the single coil 25 may be arranged at the vertices of an equilateral hexagon centered on the single coil 25. Furthermore, the vector direction of the six differential coil pairs 12 included the six coils 30 adjacent to the single coil 25 may increase by 60 degrees for each differential coil pair in a clockwise rotational direction. The vector direction of a differential coil pair 12 is defined as the direction from the coil 30 thereof adjacent to the single coil 25 toward the other coil 30 thereof.

For example, the differential coil pair (B54, B43) is arranged to be rotated 60 degrees in the clockwise direction relative to the differential coil pair (B53, B52). The differential coil pairs (B53, B52), (B54, B43), (B65, B55), (B75, B76), (B74, B85), and (B63, B73) are arranged to be sequentially rotated 60 degrees in the clockwise direction and centered on the single coil 25.

FIG. 7 describes the arrangement relationship between differential coil pairs 12 and the single coil 25 adjacent to the differential coil pairs 12. The two coils 30 included in each differential coil pair 12 are respectively adjacent to different single coils 25.

For example, the coils B53 and B52 included in the differential coil pair (B53, B52) are respectively adjacent to the single coil 25 (B64) and the single coil 25 (B41).

The single coil 25 may be connected to a single wire 26 for a ground, power supply, or single signal. As another example, the single coils 25 may be arranged uniformly within the grid 200 to serve as a barrier that restricts interference between differential coil pairs 12.

With the present embodiment, in the grid 200 where the row direction and column direction have an angle of 60 degrees relative to each other, the interference between coils 30 included in adjacent differential coil pairs 12 can be decreased and the differential coil pairs 12 can be arranged with high density. In other words, as shown in FIG. 8, among adjacent differential coil pairs 12, the two coils 30 included in one of the differential coil pairs 12 can each be arranged at the same distance from one of the coils 30 included in the other differential coil pair 12.

The above embodiment describes an example in which the differential wires 24 are connected to the differential coil pairs 12, but it is not necessary to have differential wires 24 connected to all of the differential coil pairs 12. In this case, among the differential coil pairs 12 arranged in the grid 200, the coils 30 included in certain differential coil pairs 12 may be connected to single wires for a ground, a power supply, or a single signal.

Furthermore, the above embodiment describes an example in which coils 30 are used for wireless communication, but through-vias or electrode pins may be used for interconnections between multilayer chips, such as TSV, may be arranged at some of the coil arrangement positions. Furthermore, connectors or the like may be used at some of the coil arrangement positions.

As shown in FIG. 7, the single coils 25 are arranged to sandwich each of the six coils 30 in the row direction and the column direction. For each single coil 25, each coil 30 that a distance D away in the row direction forms a differential coil pair 12 with the coil 30 that is a distance D from this coil 30 in a direction at an angle of 60 degrees relative to the column direction.

Furthermore, for each single coil 25, each coil 30 that is a distance 2D away in the row direction forms a differential coil pair 12 with the coil 30 that is a distance D away from this coil 30 in a 180 degree direction. Yet further, for each single coil 25, each coil 30 that is a distance 3D away in the row direction forms a differential coil pair 12 with the coil 30 that is a distance D away from this coil 30 in a 120 degree direction.

For each single coil 25, each coil 30 that is a distance 4D away in the row direction forms a differential coil pair 12 with the coil 30 that is a distance D away from this coil 30 in a 300 degree direction. In other words, for each single coil 25, each coil 30 that is a distance 3D away in the row direction forms a differential coil pair 12 with the coil 30 that is a distance 4D away from the single coil 25.

For each single coil 25, each coil 30 that is a distance 5D away in the row direction forms a differential coil pair 12 with the coil 30 that is a distance D away from this coil 30 in a 0 degree direction. For each single coil 25, each coil 30 that is a distance 6D away in the row direction forms a differential coil pair 12 with the coil 30 that is a distance D away from this coil 30 in a 240 degree direction.

This group of a single coil 25 and six coils 30 is repeatedly arranged in the column direction. Furthermore, when the position of a single coil 25 in each column is increased by D in the column direction, the position of this single coil 25 is increased by 3D in the row direction. With this arrangement, as shown in FIG. 8, the six differential coil pairs 12 arranged around each single coil 25 differ in direction by 60 degrees each.

Figure 9:
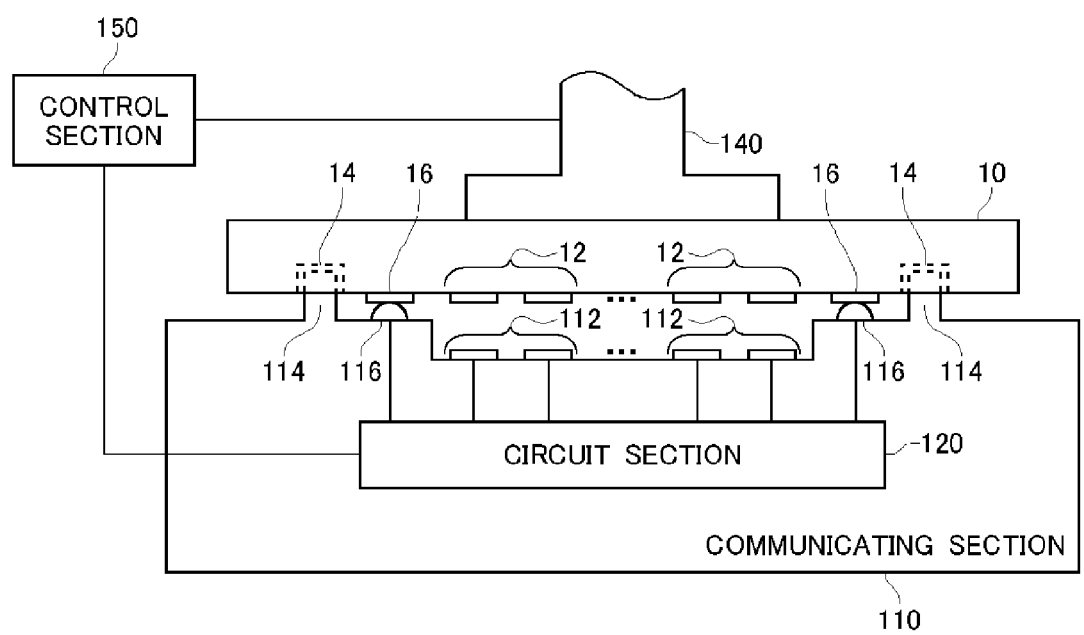
FIG. 9 shows a modification of the wireless communication system 100 according to the present embodiment.

FIG. 9 shows a modification of the wireless communication system 100 according to the present embodiment. In the wireless communication system 100 of the present modification, components having the same function and configuration as those in the wireless communication system 100 according to the embodiment shown in FIG. 1 are given the same reference numerals, and descriptions thereof are omitted. The wireless communication system 100 of the present modification performs wired communication using electrode sections, in addition to wireless communication, between the wireless communication apparatus 10 and the access apparatus.

The wireless communication apparatus 10 includes electrode sections 16 connected to an internal circuit. The electrode sections 16 may be arranged in the grid 200 at positions where coils 30 are not arranged. The communicating section 110 includes electrode sections 116 that are connected to the circuit section 120 and correspond to the electrode sections 16 of the wireless communication apparatus 10. The electrode sections 16 of the wireless communication apparatus 10 and the corresponding electrode sections 116 of the communicating section 110 contact each other to be electrically connected.

In the communicating section 110, the heights of the electrode sections 116 and the external coil pairs 112 in a direction that is perpendicular to the surface on which the external coil pairs 112 are arranged in the grid are adjusted to be predetermined heights. In other words, the heights of the electrode sections 116 and the external coil pairs 112 are adjusted and arranged in advance such that, when the electrode sections 16 are connected to the corresponding electrode sections 116, the relative positions of the differential coil pairs 12 and the corresponding external coil pairs 112 are adjusted to a position at which magnetic coupling is achieved between the coil pairs.

In this way, the wireless communication system 100 of the present embodiment can perform wired communication using the electrode sections 16 and electrode sections 116, while also performing wireless communication, between the wireless communication apparatus 10 and the access apparatus. Either the electrode sections 16 or the electrode sections 116 may be electrodes in a BGA (Ball Grid Array) or LGA (Land Grid Array), for example. Instead, the electrode sections 16 and the electrode sections 116 may be connectors that engage with each other to be electrically connected.

Here, the marker portion 14 may be formed on the surface of the wireless communication apparatus 10 on which the differential coil pairs 12 are formed, and may be a protrusion or depression that engages with the reference position portion 114. Instead, the marker portion 14 and the reference position portion 114 may be connectors or the like.

The marker portion 14 and the reference position portion 114 are formed at predetermined positions, and therefore, by engaging these components, the relative positions of the wireless communication apparatus 10 and the communicating section 110 can be set. Accordingly, the wireless communication system 100 can set the relative positions of the wireless communication apparatus 10 and the communicating section 110 without using the detecting section 130 or the like, and can therefore quickly perform communication between the wireless communication apparatus 10 and the access apparatus.

The wireless communication system 100 of the present embodiment described above is an example in which the marker portion 14 is provided on the wireless communication apparatus 10 and the relative positions of the wireless communication apparatus 10 and communicating section 110 are determined by comparing or engaging the marker portion 14 with the reference position portion 114. Instead, the wireless communication system 100 may use the contour of the wireless communication apparatus 10 as a marker, and set the relative positions of the wireless communication apparatus 10 and the communicating section 110 by comparing this contour to the reference position portion 114. In this case, the control section 150 controls the movement of the wireless communication apparatus 10 according to detection results concerning the reference position portion 114 and the outer edge of the wireless communication apparatus 10 by the detecting section 130.

Instead of or in addition to the above, the wireless communication system 100 may set the relative positions of the wireless communication apparatus 10 and the communicating section 110 based on the amplitude strength of the power and/or transmission signal exchanged between the external coil pairs 112 and the corresponding differential coil pairs 12. In this case, the control section 150 adjusts the relative positions of the wireless communication apparatus 10 and the communicating section 110 in a manner to maximize the amplitude strength. In this way, the wireless communication system 100 can omit the wireless communication apparatus 10 and the marker portion.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A wireless communication system comprising:
    a wireless communication apparatus comprising a plurality of differential coil pairs that respectively transmit and receive differential signals to and from a plurality of external differential coil pairs, through magnetic coupling, a marker portion having a predetermined relative position with respect to the differential coil pairs, and a first electrode section that is provided at a position where the differential coil pairs are not arranged, wherein
    one coil in a first differential coil pair among the differential coil pairs is provided at a distance from each of two coils of a second differential coil pair among the differential coil pairs that is less than or equal to a distance between the two coils of the second differential coil pair, and
    the other coil of the first differential coil pair is provided at a distance from each of the two coils of the second differential coil pair that is greater than the distance between the two coils of the second differential coil pair; and
    an access apparatus that communicates with the wireless communication apparatus, and comprises:
    the plurality of external differential coil pairs,
    a reference position portion having a predetermined relative position with respect to the external differential coil pairs and operable to engage with the marker portion,
    a second electrode section that is operable to contact the first electrode section so that the first electrode section and the second electrode section are electrically connected, and
    an aligning section that adjusts the relative positions of the marker portion and the reference position portion, wherein
    when the first electrode section is connected to the second electrode section, the relative position of the differential coil pair and the corresponding external coil pair is held so that a magnetic coupling between the differential coil pair and the corresponding external coil pair is achieved.

2. The wireless communication system according to claim 1, wherein
    an arrangement direction of two coils in the first differential coil pair is different from an arrangement direction of the two coils in the second differential coil pair.

3. The wireless communication system according to claim 1, comprising a plurality of differential wires that each include a negative wire and a positive wire and electrically transmit one of the differential signals, wherein
the differential coil pairs correspond respectively to the differential wires, and
among the two coils of each differential coil pair, one of the coils is a positive coil connected to the positive wire of the corresponding differential wire and the other is a negative coil connected to the negative wire of the corresponding differential wire.

4. The wireless communication system according to claim 3, wherein
for at least two differential coil pairs among the plurality of differential coil pairs, a distance between the positive coils is different from a distance between the negative coils, and
concerning (I) a set of the distance from the positive coil of one differential coil pair to the negative coil of another differential coil pair and the distance from the positive coil of the one differential coil pair to the positive coil of the other differential coil pair and (II) a set of the distance from the negative coil of the one differential coil pair to the positive coil of the other differential coil pair and the distance from the negative coil of the one differential coil pair to the negative coil of the other differential coil pair, the distances in at least one of (I) and (II) are substantially equal to each other.

5. The wireless communication system according to claim 3, wherein
the positive coil and the negative coil included in each differential coil pair are arranged in a grid, and at least two adjacent differential coil pairs have different arrangement directions.

6. The wireless communication apparatus system according to claim 5, wherein
the grid has a shape in which coil arrangement positions are repeated at constant intervals in a row direction and a column direction, which are orthogonal to each other,
differential coil pairs that are arranged in a first arrangement direction that has an angle of 45 degrees relative to both the row direction and the column direction are first differential coil pairs, and differential coil pairs that are arranged in a second arrangement direction that is orthogonal to the first arrangement direction are second differential coil pairs, and
the first differential coil pairs and the second differential coil pairs are arranged in an alternating manner in both the first arrangement direction and the second arrangement direction.

7. The wireless communication system according to claim 6, wherein
the differential coil pairs are arranged such that a straight line extending through each of the first differential coil pairs passes through a center of the second differential coil pair adjacent to the first differential coil pair in the first arrangement direction, and a straight line extending through each of the second differential coil pairs passes through a center of the first differential coil pair adjacent to the second differential coil pair in the second arrangement direction.

8. The wireless communication system according to claim 5, further comprising one or more single coils that transmit and receive a reference potential, power supply, or single-ended signal to and from external coils, through magnetic coupling.

9. The wireless communication system according to claim 8, wherein
the single coils are arranged in the grid.

10. The wireless communication system according to claim 5, wherein
the grid has a shape in which coil arrangement positions are repeated at constant intervals in a row direction and a column direction, which are at an angle of 60 degrees relative to each other,
the wireless communication apparatus further comprises single coils arranged in the grid with a uniform distribution, and
at each of six coil arrangement positions adjacent to each single coil, either the positive coil or the negative coil of one of six differential coil pairs is arranged, and the arrangement direction differs by 60 degrees between each pair of adjacent differential coil pairs among the six differential coil pairs.

11. The wireless communication system according to claim 10, wherein
the six coil arrangement positions are located at vertices of an equilateral hexagon centered on the corresponding single coil, and the directions of the six differential coil pairs increase by 60 degrees every time a position relative to the corresponding single coil rotates in a first direction.

12. The wireless communication system according to claim 11, wherein
the positive coil and the negative coil included in each differential coil pair are respectively adjacent to different single coils.

13. The wireless communication system according to claim 5, further comprising one or more electrode sections that are arranged in the grid and electrically connected to the outside to transmit and receive a reference potential, power supply, or single-ended signal to and from the outside.

14. The wireless communication system according to claim 3, wherein
for at least two adjacent differential coil pairs among the plurality of differential coil pairs, the resonance frequency for the positive coil and the negative coil in one of the at least two differential coil pairs is different from a resonance frequency for the positive coil and the negative coil in another of the at least two differential coil pairs.

15. The wireless communication system according to claim 1, wherein
the differential coil pairs transmit and receive the differential signals using two or more frequencies.

16. The wireless communication system according to claim 1, wherein
one or more differential coil pairs among the plurality of differential coil pairs is an 8-shaped coil that, upon receiving a single-ended signal, converts the single-ended signal into a differential signal and transmits the resulting differential signal, and, upon receiving a differential signal, converts the received differential signal into a single-ended signal.

* * * * *